(12) United States Patent
DeSanto et al.

(10) Patent No.: US 8,691,172 B2
(45) Date of Patent: Apr. 8, 2014

(54) FORSTERITE AND METHOD FOR MAKING

(75) Inventors: Dale F. DeSanto, Wildwood, MI (US); Robert A. Pattillo, Birmingham, AL (US)

(73) Assignee: KBI Enterprises, LLC, Chesterfield, MO (US)

( * ) Notice: Subject to any disclaimer, the term of this patent is extended or adjusted under 35 U.S.C. 154(b) by 113 days.

(21) Appl. No.: 12/919,150

(22) PCT Filed: Feb. 25, 2009

(86) PCT No.: PCT/US2009/035187
§ 371 (c)(1),
(2), (4) Date: Aug. 24, 2010

(87) PCT Pub. No.: WO2009/108728
PCT Pub. Date: Sep. 3, 2009

(65) Prior Publication Data
US 2011/0008234 A1    Jan. 13, 2011

Related U.S. Application Data

(60) Provisional application No. 61/031,262, filed on Feb. 25, 2008, provisional application No. 61/031,265, filed on Feb. 25, 2008, provisional application No. 61/031,252, filed on Feb. 25, 2008.

(51) Int. Cl.
*C01B 33/24* (2006.01)

(52) U.S. Cl.
USPC .......................................... 423/331

(58) Field of Classification Search
USPC .......................................... 423/331
See application file for complete search history.

(56) References Cited

U.S. PATENT DOCUMENTS

| | | | |
|---|---|---|---|
| 2,418,026 A * | 3/1947 | Goldschmidt | ............. 501/117 |
| 4,127,429 A | 11/1978 | Ichida et al. | |
| 4,190,469 A | 2/1980 | Ichida et al. | |
| 4,249,966 A | 2/1981 | Ichida et al. | |
| 4,497,901 A | 2/1985 | Ohtsuki et al. | |
| 4,977,024 A | 12/1990 | Morita et al. | |
| 4,985,164 A | 1/1991 | Delvaux et al. | |
| 5,174,853 A | 12/1992 | Yamaguchi et al. | |
| 5,453,408 A | 9/1995 | Huard et al. | |
| 5,525,855 A | 6/1996 | Gotoh et al. | |
| 5,969,902 A | 10/1999 | Okumura et al. | |
| 6,300,262 B1 | 10/2001 | Beall | |
| 6,632,757 B2 | 10/2003 | Beall | |
| 6,660,669 B2 | 12/2003 | Beall et al. | |
| 6,813,903 B2 | 11/2004 | Beall et al. | |
| 6,942,740 B2 | 9/2005 | Hayakawa et al. | |
| 7,208,434 B2 | 4/2007 | Kim et al. | |
| 7,371,291 B2 | 5/2008 | Hayakawa et al. | |

OTHER PUBLICATIONS

Faure et al., A developmental model of olivine morphology as a function of the cooling rate and teh degree of undercooling, Contrib Mineral Petrol (2003) 145: 251-263.*

The Electrothermal Section of the Electrotechnical Laboratory, Electrically Fused Forsterite-Olivine, I-II, article, 1943, pp. 405-413, vol. 26, No. 12, published in the Journal of the American Ceramic Society-Electrotechnical Laboratory, Bureau of Mines.

* cited by examiner

*Primary Examiner* — Stanley Silverman
*Assistant Examiner* — Haytham Soliman
(74) *Attorney, Agent, or Firm* — Matthews Edwards LLC

(57) ABSTRACT

High temperature fusion of olivine to produce forsterite in the presence of a reducing agent such as carbon can produce improved refractories when in addition to MgO additional, particular oxidation and/or oxidative reaction environments beyond the use of Carbon are employed.

9 Claims, 3 Drawing Sheets

FORSTERITE AND METHOD FOR MAKING

This application is submitted under 35 U.S.C. 371 claiming priority to PCT/US2009/035187, filed Feb. 25, 2009; which application claims the benefit of U.S. Provisional Applications Nos. 61/031,252; 61/031,262; and 61/031,265, all filed Feb. 25, 2008, and herein incorporates those applications by reference.

TECHNICAL FIELD

The present invention relates to the refractory mineral forsterite and methods for producing same, particularly by high temperature fusion melts of olivine in the presence of a reducing agent such as carbon, but improved by various enhanced oxidative conditions.

BACKGROUND ART

Relatively pure forsterite ($Mg_2SiO_4$) has been determined to have a melting point of as much as 1890° C. ±20° C. As such, it qualifies as being among the types of basic super refractories needed for many applications. For example, it finds application as a material of construction for molten metal flow control devices used in the steel industry, and for linings and coatings employed in steel ladles which are in turn used to collect molten metal during alloy fabrication and smelting. The steel industry historically used basic materials such as magnesite and dolomite because of the limiting factors of corrosion resistance and temperature resistance of alumino-silicate refractories, which are less than that of the minerals based upon MgO compounds. Therefore, forsterite could provide refractory linings with properties superior to other commonly used materials, but with unique physical and chemical properties not available from the other minerals.

Forsterite ($Mg_2SiO_4$) does not occur naturally in a pure form, but, in isomorphous combination with fayalite ($Fe_2SiO_4$). Tremendous quantities appear as dunite olivine (($Mg,Fe)_2SiO_4$), in the state of Washington and in the Appalachian Mountain areas of North Carolina and Georgia. Recently, large quantities of olivine have arisen, in new geographic regions, but methods are needed to increase the refractoriness of the final forsterite. To produce the forsterite from olivine (($Mg,Fe)_2SiO_4$), in the past the olivine has been melted in an electric arc-resistance furnace, with simultaneous reduction of the iron (fayalite) components, to form a product consisting essentially of crystalline forsterite.

The mineral commonly called olivine consists of an isomorphous combination of forsterite (($Mg)_2SiO_4$) and fayalite ($Fe_2SiO_4$), which within the range of 5-25% of fayalite is often termed chrysolite. In addition to secondary minerals formed by alteration, such as serpentine and chlorite, olivine is commonly associated with several primary minerals, including chromite, bronzite and enstatite. Mineralogically the group term "olivine" includes orthosilicates of divalent bases crystallizing in the orthorhombic system. This larger group may be represented by the formula (Mg, Fe, Mn, Ca) (Mg, Fe, Mn, Zn, Pb)$SiO_4$, with the following recognized end compounds: Forsterite, $MG_2SiO_4$; fayalite, $Fe_2SiO_4$; tephroite, $Mn_2SiO_4$; monticellite, $CaMgSiO_4$; glaucochroite, $CaMnSiO_4$; and larsenite, $PbZnSiO_4$.

During the fusion of olivine to produce the forsterite, a reducing agent, most commonly, carbon is present. The main impurities within the olivine that need to be removed during the course of the high temperature fusion are the various iron oxides FeO, $Fe_2O_3$ and $Fe_3O_2$. As the fusion progresses, the molten ore is converted to the form of a molten glass. In this amorphous state, the iron oxides along with silicon oxide are easily reduced to a ferrosilicon alloy, i.e., an agglomeration of metallic iron and metallic silicon. The ferrosilicon alloys are separated from the oxide melt and collected as a by-product for use in other applications. The remaining molten oxide which comprises predominantly magnesium silicate is poured out of the furnace into molds. The melt within those molds is then allowed to cool, forming crystalline forsterite.

While the carbon reducing agent readily reduces the iron components of the melt, there exists unwanted excess silica which tends to weaken the load bearing strength of the refractory but is not expelled during the reduction. Additional carbon up to 5% lowered the undesired silicon oxide $SiO_2$ to less than 2%. Also, it was previously found that additions of magnesium oxide and calcium oxide further assisted in removing the silica ($SiO_2$). However, this inhibited the reduction of the iron. Accordingly, the carbon reducing content has continued to remain to be believed critical to the process.

Previously, the crystalline forsterite has been rather weak and friable with average crystal sizes being smaller than 200 microns. A method for promoting the growth of larger crystals during the course of forsterite production would be a welcomed advancement in the art.

SUMMARY OF THE INVENTION

We have discovered that surprisingly by stagewise altering of the oxidation state of the melt into an oxygen rich environment, rather than a carbon rich environment, stronger, and larger crystals of forsterite are likely, which in turn are beneficial because of more effective reduction of excess $SiO_2$ from the melt and formation of fewer carbide impurities at the grain boundary.

DETAILED DESCRIPTION OF THE INVENTION

During the production of an excess of carbon in the melt, there is promoted the formation of carbides which we have found to inhibit bonding of the forsterite crystals at its grain boundaries. Although it is not entirely understood, we have added oxygen by introduction of minerals which we believe has inhibited the amount of carbide remaining in the melt during the cooling process. Ambient air may be passed through the melt, or oxidizing agents such as particular oxides may be added to the melt at the end of the fusion process as, for example, during cooling, which would occur after the material is poured out of the electric furnace into molds, but before final crushing.

Alternatively, an oxidizing environment may be achieved by blowing air through the melt. Compressed air or other devices of suitable capacity are capable of blowing the air and also advantageously offer a controlled cooling process.

When employing oxides to enhance the oxidizing environment, preferably oxides selected from the group consisting of calcium oxide, boron oxide, titanium oxide, zirconium oxide, nickel oxide, chromium oxide, barium oxide, and/or manganese oxide, or a combination thereof may be employed for this purpose. The effectiveness of the oxides, although not completely understood, may be due to the creation of a sort of impurity that collects at the grain boundaries which impurity enhances the ability of the particulate crystals to bind with one another and to grow as much as double in size. Typical addition of these oxidizing agents will range from 0.5% to 20% by weight of the melt. The strongest effects of the oxidizing agents are observed when employing compounds and oxides that are less soluble in the forsterite crystalline structure. Preferably for example, Periclase, or high purity MgO, is utilized. It can be combined with one or more oxides. CaO or limestone may be of assistance in conjunction with other oxides, but alone may have an adverse effect on load strength, etc. at very low temperatures. It is important to use oxides of magnesium to control silica content. Additives which are insoluble in the forsterite bulk crystals are believed to be particularly preferred. Excess silica in the Forsterite grain is deleterious because low melting glass will be form by reaction with impurities.

Certain of the oxidizing agents are more effective when added after the by-product ferrosilicon has been separated from the melt, and after the carbon has been substantially depleted during the course of the chemical reduction, such as Chrome Oxide($Cr_2O_3$). Other oxidizing agents are more effective prior to completely reducing the iron oxides and silica to metallic ferrosilicon alloys, as long as those agents are not readily reduced by carbon.

The following examples and tables are intended to illustrate the invention without being unduly limiting thereof. Please note that these examples and graphs together with tables and other analytical data are exemplary of the specification as recited above.

EXAMPLE 1

An oxygen rich environment was created and experimental fusion of olivine (with carbon present) of the following composition was performed to establish the base conditions of a fused olivine aggregate, wherein all values are in units of the metric system. The furnace conditions were of a normal fusion process using 8% coke additions. The carbides were dissipated rather than the excess being trapped in the boundary layer. All amounts are in weight %. Note that $Al_2O_3$ is an impurity in the olivine and is further accumulated from the furnace during fusion. CaO is also an impurity.

| MgO | $SiO_2$ | $Al_2O_3$ | CaO | $Fe_2O_3$ | $MgO/SiO_2$ Ratio |
|---|---|---|---|---|---|
| 45.75 | 44.03 | 1.63 | .20 | 8.39 | 1.04 |

| | MgO | $SiO_2$ | $Al_2O_3$ | CaO | $Fe_2O_3$ | $MgO/SiO_2$ Ratio |
|---|---|---|---|---|---|---|
| Bulk Xtal | 52.63 | 44.88 | 2.08 | 0.41 | 0.41 | 1.17 |
| Grain Boundary | 54.67 | 43.39 | 1.86 | 0.08 | 0.02 | 1.26 |

The theoretical $MgO/SiO_2$ ratio of 1.34 for a stoichometric composition of Forsterite was not achieved.

From FIGS. 1-7, it may be seen that the impurities of alumina, calcia, and carbon are deposited in the grain boundaries and also as localized nodules. These compounds are low melting and result in the overall reduction of the refractoriness of the Forsterite grain.

In order to improve the aggregate, an addition of MgO of an amount of 5% was added to form Periclase crystals in the grain boundaries. The olivine\MgO mixture was fused using 8% coke and the resulting aggregate was analyzed by XRF. The bulk chemistry is as follows.

| | MgO | $SiO_2$ | $Al_2O_3$ | CaO | $Fe_2O_3$ | $MgO/SiO_2$ Ratio |
|---|---|---|---|---|---|---|
| Bulk Xtal | 56.26 | 41.77 | 0.78 | 0.32 | 0.87 | 1.35 |
| Grain Boundary | 59.78 | 39.13 | 0.89 | 0.12 | 0.08 | 1.53 |

The theoretical $MgO/SiO_2$ ratio was achieved with this composition and the concentration of MgO in the grain boundaries was in excess of the goal of 1.35.

By adding the MgO to the fusion, the separate Forsterite crystals were bonded together to form a physically stronger aggregate. Even though the overall chemistry was still not equal to the theoretical value, the refractoriness was improved due to the improved chemistry in the grain boundaries. This illustrates that the bulk chemical analysis does not take into consideration of the distribution of the additives concentrated in the grain boundaries. It was observed that the chemistry varied significantly between the boundary and the bulk of the Forsterite crystal.

FIGS. 8-14 illustrate the improvement in the structure by way of reduction of impurity concentrations.

By the addition of compounds that are insoluble in the Forsterite structure, the composition of the material in the grain boundaries can be selectively modified and the aggregate improved. The Forsterite can be "cleaned" by the use of excess MgO. The magnesite should ideally be added after the carbon is depleted so that it will not be reduced.

Normally the impurities such as iron, alumina, or calcia will be concentrated in the boundaries which reduces the refractoriness of the grain. Additives that will concentrate in the boundaries and react with the impurities to form higher melting compounds without dissolving in the forsterite crystalline structure have a beneficial effect. Examples of such additives are MgO, and $Zr_2O$. The forsterite crystal structure is soluble to many compounds. The Periclase on the other hand, with e.g. MgO and $Zr_2O$ is much less prone to substitution in the crystal lattice. The resulting structure is one of the Forsterite crystal surrounded by Periclase crystals.

EXAMPLE 2

A fusion of the olivine with 5% Zirconia added was performed to illustrate the effect of additions that are insoluble in the Fosterite structure. The following X-Ray image shows the distribution of impurities after adding the zirconia to the melt.

From FIGS. 15-22, it is seen that the zirconia is precipitated in the grain boundaries and it reacts with the impurities to form very high melting compounds.

The use of additives that easily substitute in the Forsterite crystal structure may alter its characteristics and not improve the grain boundary composition. The stability of the additive should be such that they are not reduced by carbon since this is the common reducing agent used to convert the iron oxide to metallic form so it can be separated and removed from the melt. Also the formation of carbides can potentially cause problems with the aggregates due to their instability at high temperature. Certain additives, for example, chromium oxide will substitute within the forsterite crystal lattice and still improve refractoriness in the bulk material without having to modify the grain boundary. The crystal size was improved to over 250 microns in all cases and in the case of Periclase will average 500 microns.

Figure 1:
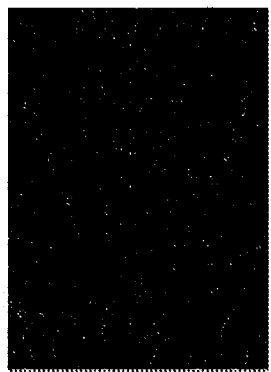
FIG. 1 is an X-ray image of olivine fusion-no additives, referred to as Al (I) FOST3.XMP.
Figure 2:
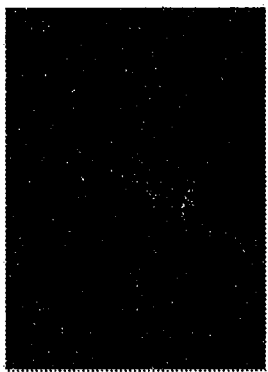
FIG. 2 is an X-ray image of olivine fusion-no additives, referred to as C (I) FOST3.XMP.
Figure 3:
FIG. 3 is an X-ray image of olivine fusion-no additives, referred to as Ca (I) FOST3.XMP.
Figure 4:
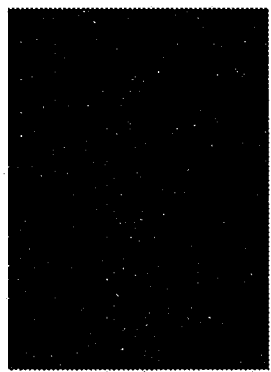
FIG. 4 is an X-ray image of olivine fusion-no additives, referred to as Fe (I) FOST3.XMP.
Figure 5:
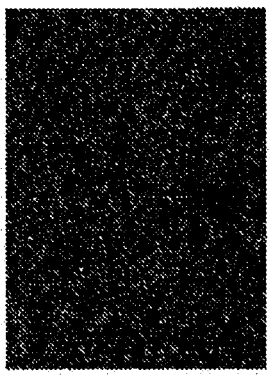
FIG. 5 is an X-ray image of olivine fusion-no additives, referred to as Si (I) FOST3.XMP.
Figure 6:
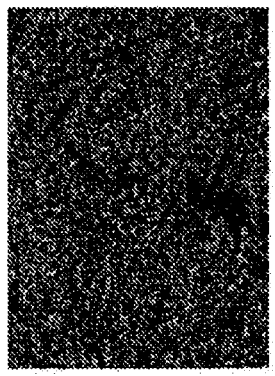
FIG. 6 is an X-ray image of olivine fusion-no additives, referred to as Mg (I) FOST3.XMP.
Figure 7:
FIG. 7 is an X-ray image of olivine fusion-no additives, referred to as IM (I) FOST3.XMP.
Figure 8:
FIG. 8 is an X-ray image of fused olivine with 5% MgO added, referred to as AI (I) FOST14GB.XMP.
Figure 9:
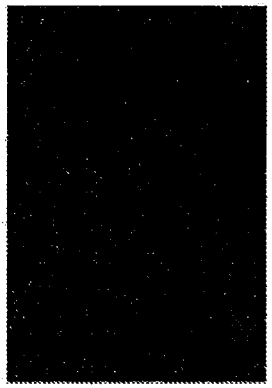
FIG. 9 is an X-ray image of fused olivine with 5% MgO added, referred to as C (I) FOST14GB.XMP.
Figure 10:
FIG. 10 is an X-ray image of fused olivine with 5% MgO added, referred to as Ca (I) FOST14GB.XMP.
Figure 11:
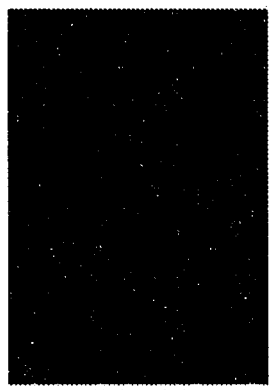
FIG. 11 is an X-ray image of fused olivine with 5% MgO added, referred to as Fe (I) FOST14GB.XMP.
Figure 12:
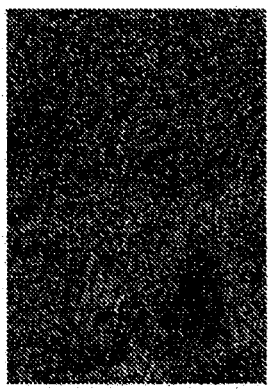
FIG. 12 is an X-ray image of fused olivine with 5% MgO added, referred to as Mg (I) FOST14GB.XMP.
Figure 13:
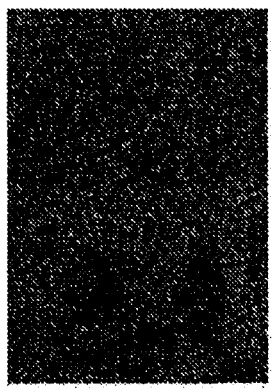
FIG. 13 is an X-ray image of fused olivine with 5% MgO added, referred to as Si (I) FOST14GB.XMP.
Figure 14:
FIG. 14 is an X-ray image of fused olivine with 5% MgO added, referred to as IM (I) FOST14GB.XMP.
Figure 15:
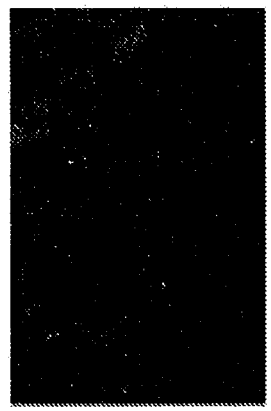
FIG. 15 is an X-ray image of fused forsterite with 5% $ZrO_2$ added, referred to as AI (I).
Figure 16:
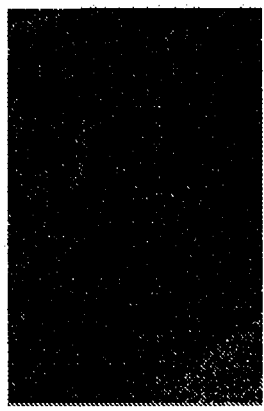
FIG. 16 is an X-ray image of fused forsterite with 5% $ZrO_2$ added, referred to as C (I).
Figure 17:
FIG. 17 is an X-ray image of fused forsterite with 5% $ZrO_2$ added, referred to as Ca (I).
Figure 18:
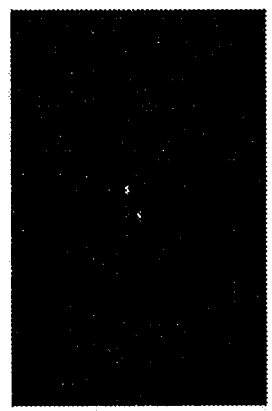
FIG. 18 is an X-ray image of fused forsterite with 5% $ZrO_2$ added, referred to as Fe (I).
Figure 19:
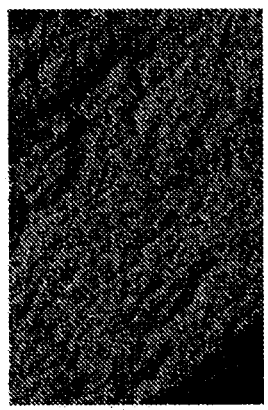
FIG. 19 is an X-ray image of fused forsterite with 5% $ZrO_2$ added, referred to as Mg (I).
Figure 20:
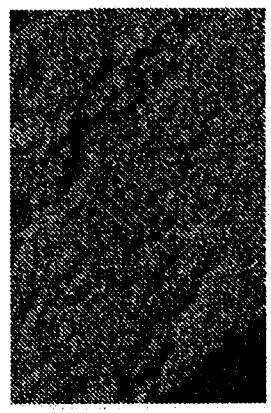
FIG. 20 is an X-ray image of fused forsterite with 5% $ZrO_2$ added, referred to as Si (I).
Figure 21:
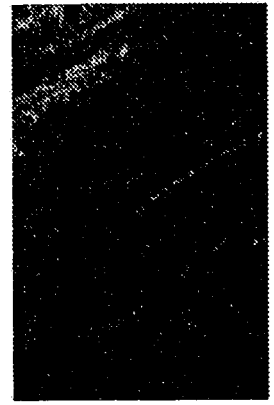
FIG. 21 is an X-ray image of fused forsterite with 5% $ZrO_2$ added, referred to as Zr (I).
Figure 22:
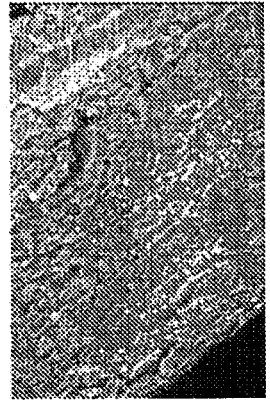
FIG. 22 is an X-ray image of fused forsterite with 5% $ZrO_2$ added, referred to as IM (I).

Numerous modifications and variations of the present invention may be made, in light of the above teachings, without departing from the basic spirit of the present invention. Accordingly, it will be appreciated by those skilled in the art that, within the scope of the appended claims, the invention may be practiced otherwise than as specifically described herein.

What is claimed is:

1. In a method for producing forsterite by high temperature fusion of olivine in the presence of a carbon reducing agent; the improvement comprising-after reducing the carbon and during the cooling of the fusion, adding oxides selected from the group of oxides made from calcium, boron, titanium, zirconium, nickel, chromium, barium, and manganese, accompanied by magnesium oxide, in an amount of from between about 0.5 percent and about 20 percent by weight of the fusion, to react with impurities concentrated in grain boundaries of the forsterite, wherein the added oxides during cooling further reduces the amount of carbide remaining in the melt to inhibit crystalline growth such that after cooling, the forsterite crystals have a resultant average particle size of above 200 microns.

2. The method of claim 1 wherein the oxide additives are added after the ferrosilicon is separated from the melt.

3. The method of claim 1 wherein the added oxides during cooling reduces the amount of carbide remaining in the melt to inhibit crystalline growth such that after cooling, the forsterite crystals have a resultant average particle size above 500 microns.

4. The method of claim 1 wherein the magnesium oxide is at least 60 % pure.

5. The method of claim 1 further comprising depleting the carbides prior to adding the oxides.

6. In a method for producing forsterite by high temperature fusion of olivine in the presence of a carbon reducing agent; the improvement comprising-after reducing the carbon and during the cooling of the fusion, adding oxides selected from the group of oxides made from calcium, boron, titanium, zirconium, nickel, chromium, barium, and manganese, accompanied by magnesium oxide, in an amount of from between about 0.5 percent and about 20 percent by weight of the fusion, to react with impurities concentrated in grain boundaries of the forsterite and form higher melting compounds, wherein the added oxides during cooling further reduces the amount of carbide remaining in the melt to inhibit crystalline growth such that after cooling, the forsterite crystals have a resultant average particle size of above 200 microns.

7. The method of claim 6 wherein the oxide additives are added after the ferrosilicon is separated from the melt.

8. A method for producing forsterite by high temperature fusion of olivine in the presence of a carbon reducing agent; comprising a step of:

after reducing the carbon and during the cooling of the fusion, adding oxides selected from the group of oxides made from calcium, boron, titanium, zirconium, nickel, chromium, barium, and manganese, accompanied by excess magnesium oxide, in an amount of from between about 0.5 percent and about 20 percent by weight of the fusion, to react with impurities concentrated in grain boundaries of the forsterite and form higher melting compounds, wherein the added oxides during cooling further reduces the amount of carbide remaining in the melt to inhibit crystalline growth such that after cooling, the forsterite crystals have a resultant average particle size of above 200 microns.

9. The method of claim 8 wherein the oxide additives are added after the ferrosilicon is separated from the melt.

* * * * *